United States Patent
Li et al.

(10) Patent No.: US 7,801,356 B2
(45) Date of Patent: Sep. 21, 2010

(54) METHODS AND APPARATUSES FOR GENERATING COMPRESSED DATA REPRESENTING A VISUAL FRAME

(75) Inventors: Xiang Li, Sunnyvale, CA (US); Jiannong Gu, Santa Clara, CA (US); He Huang, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1099 days.

(21) Appl. No.: 11/458,310

(22) Filed: Jul. 18, 2006

(65) Prior Publication Data

US 2007/0263009 A1 Nov. 15, 2007

Related U.S. Application Data

(60) Provisional application No. 60/747,256, filed on May 15, 2006.

(51) Int. Cl.
*G06K 9/36* (2006.01)
(52) U.S. Cl. .................................................. 382/166
(58) Field of Classification Search ......... 382/162–167, 382/323–251; 345/589–604; 375/240–240.29; 358/1.9, 500–522, 539, 3.23
See application file for complete search history.

(56) References Cited

U.S. PATENT DOCUMENTS

| | | | |
|---|---|---|---|
| 5,751,859 A | 5/1998 | Howard | |
| 6,373,890 B1 * | 4/2002 | Freeman | 375/240 |
| 6,373,981 B1 | 4/2002 | de Queiroz et al. | |
| 6,597,736 B1 | 7/2003 | Fadel | |
| 6,646,655 B1 | 11/2003 | Brandt et al. | |
| 6,763,070 B1 | 7/2004 | Lee | |
| 6,795,506 B1 | 9/2004 | Zhang et al. | |
| 6,948,127 B1 | 9/2005 | Zhu et al. | |
| 6,950,464 B1 | 9/2005 | Shen et al. | |
| 6,959,042 B1 | 10/2005 | Liu et al. | |
| 6,968,092 B1 | 11/2005 | Winger | |
| 7,016,075 B1 * | 3/2006 | Tsukada | 358/1.9 |
| 7,039,116 B1 | 5/2006 | Zhang et al. | |
| 7,616,216 B2 * | 11/2009 | Yamakado et al. | 345/589 |

* cited by examiner

*Primary Examiner*—Sherali Ishrat
(74) *Attorney, Agent, or Firm*—Cesari and McKenna, LLP

(57) ABSTRACT

The methods and apparatuses detect a color of each of a plurality of pixels within a frame; group a portion of the plurality of pixels having a common color into a block; and generate a color list including the common color based on a threshold value corresponding to the block.

27 Claims, 6 Drawing Sheets

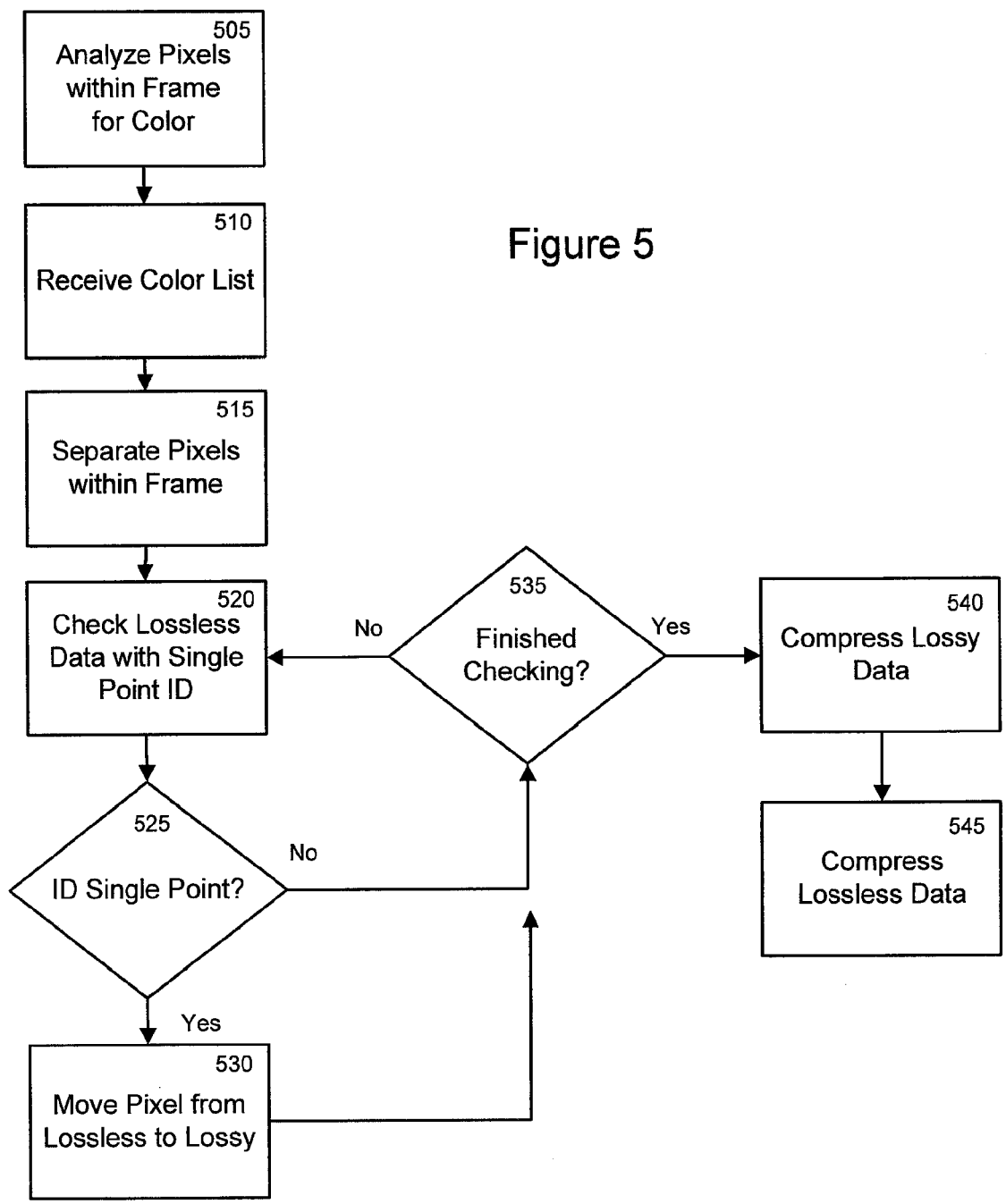

METHODS AND APPARATUSES FOR GENERATING COMPRESSED DATA REPRESENTING A VISUAL FRAME

RELATED APPLICATION

The present invention is related to, and claims the benefit of U.S. Provisional Application No. 60/747,256, filed on May 15, 2006 entitled "Methods and Apparatuses For Generating Compressed Data Representing a Visual Frame," by Xiang Li, Juannong Gu, and He Huang.

FIELD OF INVENTION

The present invention relates generally to transmitting information and, more particularly, to transmitting compressed data representing a visual frame.

BACKGROUND

There are many systems directed to compressing data that represents a visual frame. For example, compression schemes such as JPEG, RLE, and the like are known in the art for compressing data that represents a visual frame.

SUMMARY

The methods and apparatuses detect a color of each of a plurality of pixels within a frame; group a portion of the plurality of pixels having a common color into a block; and generate a color list including the common color based on a threshold value corresponding to the block.

BRIEF DESCRIPTION OF THE DRAWINGS

The accompanying drawings, which are incorporated in and constitute a part of this specification, illustrate and explain one embodiment of the methods and apparatuses for generating compressed data representing a visual frame.

In the drawings,

FIG. 5 is a flow diagram consistent with one embodiment of the methods and apparatuses for generating compressed data representing a visual frame.

DETAILED DESCRIPTION

The following detailed description of the methods and apparatuses for generating compressed data representing a visual frame refers to the accompanying drawings. The detailed description is not intended to limit the methods and apparatuses for generating compressed data representing a visual frame. Instead, the scope of the methods and apparatuses for generating compressed data representing a visual frame is defined by the appended claims and equivalents. Those skilled in the art will recognize that many other implementations are possible, consistent with the present invention.

References to a device include a desktop computer, a portable computer, a personal digital assistant, a video phone, a landline telephone, a cellular telephone, and a device capable of receiving/transmitting an electronic signal.

Figure 1:
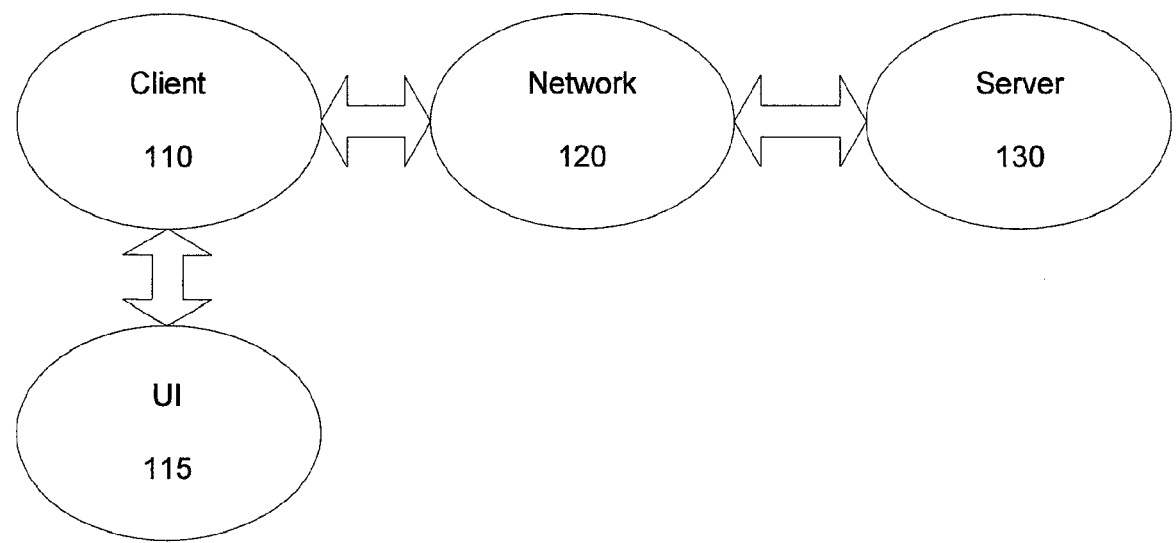
FIG. 1 is a diagram illustrating an environment within which the methods and apparatuses for generating compressed data representing a visual frame are implemented.

FIG. 1 is a diagram illustrating an environment within which the methods and apparatuses for generating compressed data representing a visual frame are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of selectively controlling a remote device below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
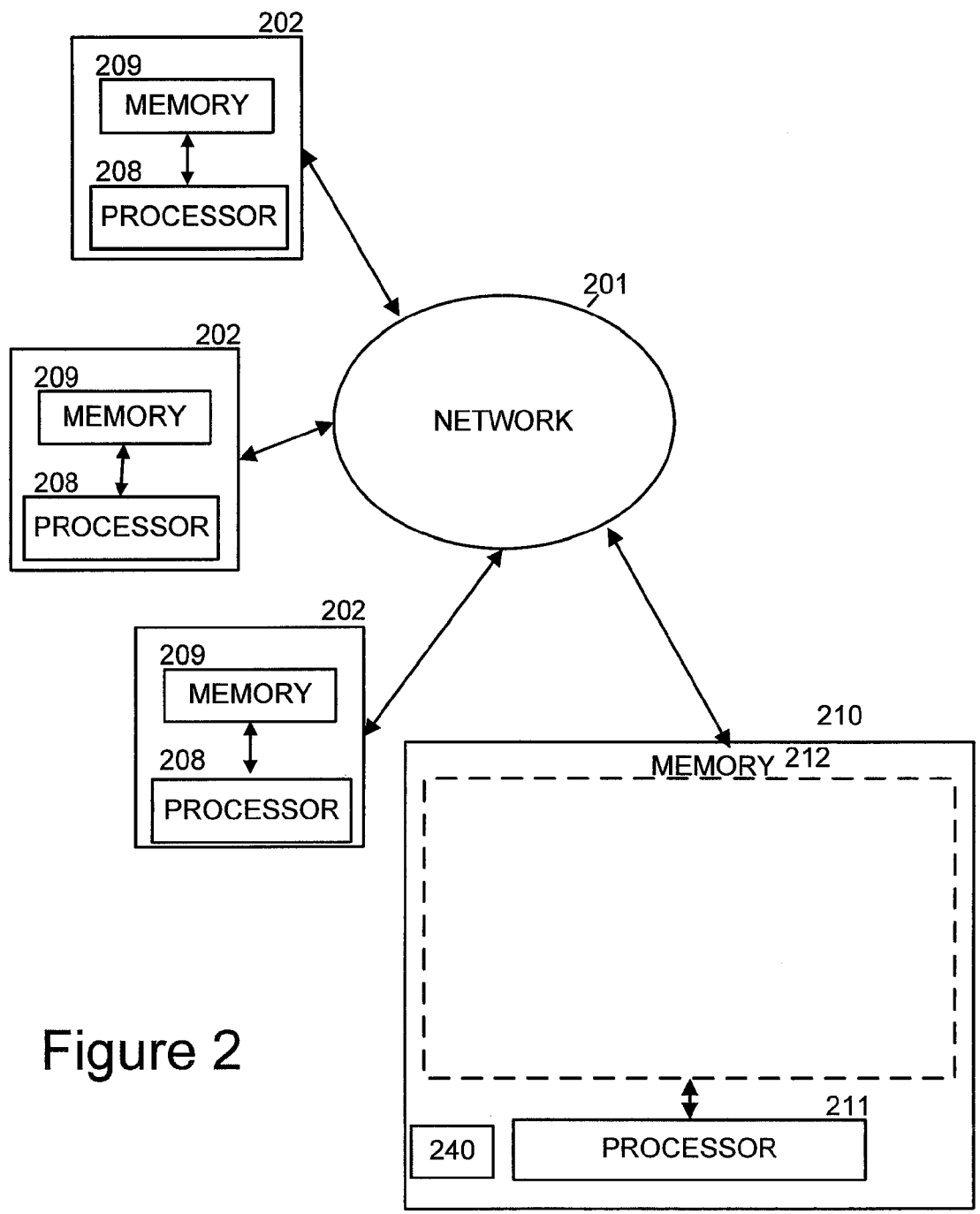
FIG. 2 is a simplified block diagram illustrating one embodiment in which the methods and apparatuses for generating compressed data representing a visual frame are implemented.

FIG. 2 is a simplified diagram illustrating an exemplary architecture in which the methods and apparatuses for generating compressed data representing a visual frame are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for generating compressed data representing a visual frame. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on transmitting compressed data representing a visual frame as determined using embodiments described below.

Figure 3:
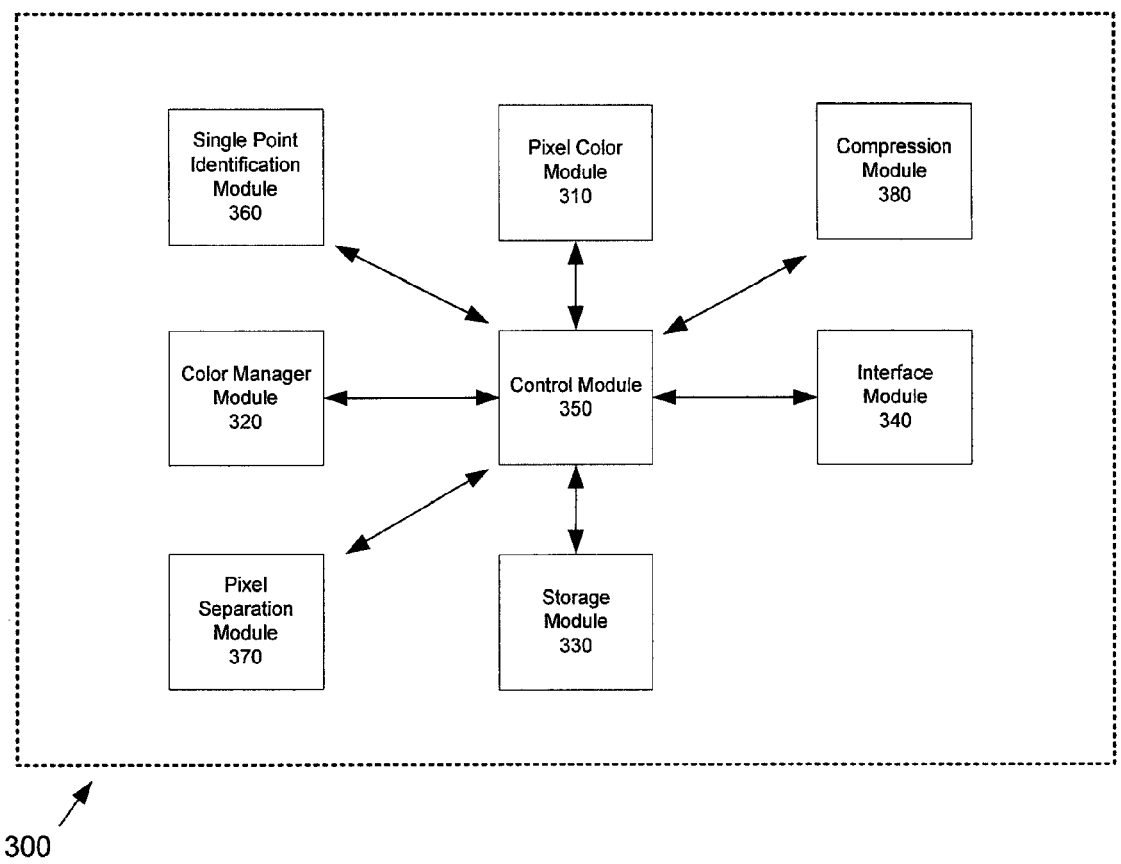
FIG. 3A is a simplified block diagram illustrating a system, consistent with one embodiment of the methods and apparatuses for generating compressed data representing a visual frame.
FIG. 3B is a table illustrating a system, consistent with one embodiment of the methods and apparatuses for generating compressed data representing a visual frame.

FIG. 3A illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a pixel color module 310, a color manager module 320, a storage module 330, an interface module 340, a control module 350, a single point identification module 360, a pixel separation module 370, and a compression module 380.

In one embodiment, the control module 350 communicates with the pixel color module 310, the color manager module 320, the storage module 330, the interface module 340, the single point identification module 360, the pixel separation module 370, and the compression module 380. In one embodiment, the control module 350 coordinates tasks, requests, and communications between the pixel color module 310, the color manager module 320, the storage module 330, the interface module 340, the single point identification module 360, the pixel separation module 370, and the compression module 380.

In one embodiment, the pixel color module 310 detects a color of each pixel within a frame.

In one embodiment, the color manager module 320 process the color information of each pixel within the frame. In one embodiment, the color manager module 320 tracks and associates the color of each pixel within the frame. For example, if the first pixel within the frame is determined to be the color blue, then the color manager module associates the color blue with the first pixel.

In one embodiment, the color manager module 320 evaluates the overall color variation within the frame. For example, if the frame is filled with a representation of a cloudless sky and each pixel shows different shades of the color blue, then the color variation within this frame would be relatively narrow and uniform. In another example, if the frame is filled with a representation of multi-colored hot air balloons, then the color variation within this frame would be relative wide and non-uniform.

In one embodiment, the color manager module 320 also identifies the number of adjacent pixels having the same color. For example, if there are 4 pixels that are adjacent to each other having the same color, then those 4 pixels may comprise a block of pixels having the same color.

In another embodiment, the color manager module 320 also identifies the number of pixels having a similar color within a predetermined color variation. In one instance, the predetermined color variation is determined based on the overall color variation within the frame. Similar to the above example, the pixels that are adjacent to each other form a block of pixels.

In another embodiment, the color manager module 320 identifies a number of pixels that have the same color within a general area. For example, pixels within the frame that are located within a predetermined number of pixels that have the same color may comprise a block of pixels having the same color.

In one embodiment, the color manager module 320 generates a color table that includes statistics of the number of blocks of pixels have the same color. Further, in one embodiment, the color table also includes the size of the blocks in terms of the number of pixels within each block where the pixels within the block have the same color.

In one embodiment, the color manager module 320 also generates a same color list. In this embodiment, the same color list identifies colors that have sufficient blocks of pixels. In one embodiment, a color identified on the same color list represent a color associated with pixels that should be categorized as lossless data. For example, the pixels having a color that is identified on the same color list are identified as being lossless data.

In one embodiment, a block of 16 pixels of the same color is the threshold for this color to be identified on the same color list. In one embodiment, in addition to a block of 16 pixels of the same color needed to be identified on the same color list, a weighted table can be utilized to collectively sum up the blocks with less than 16 pixels of the same color. For example, according to one weighted table, 3 blocks having 10 pixels of the same color are needed within a frame for this color to be identified on the same color list. Further, blocks having less than 4 pixels of the same color may be disregarded and given no weight towards having the color identified on the same color list. The exact number of pixels are utilized for exemplary purposes; any number of pixels may be utilized.

In another embodiment, any combination of blocks of the same color that collectively comprise 16 pixels of this same color is the threshold for the color to be identified on the same color list. In another embodiment, any number of pixels with a block may be utilized as the threshold to determine inclusion on the same color list and that 16 pixels is utilized as an exemplary number.

In one embodiment, the storage module 330 stores information relating to the color manager module 320 as well as pixel information relating to the pixel color module 310, single point pixel identification module 360, and pixel separation module 370.

In one embodiment, the interface module 340 detects frames from other sources and provides pixel information to other modules or devices.

In one embodiment, the single point identification module 360 identifies pixels that are associated with an isolated color. For example, if there is a pixel with a particular color such as blue that is surrounded by other pixels with a different color such as red, then the blue pixel would be identified by the single point identification module.

In another embodiment, the variation of color that is allowed prior to the identification of a single pixel by the single point identification module 360 may be varied depending on the overall color variation within the frame as determined by the color manager module 320.

Figure 3B:

In an exemplary embodiment, FIG. 3B illustrates an exemplary table 390 that includes a red column 392, a green column 394, and a blue column 396. Each of the columns 392, 394, and 396 represents a red, green, and blue color value component of a particular pixel, respectively. In this example, a particular pixel within a frame is represented by a "single color" label and has a red color value of 100, a green color value of 125, and a blue color value of 130. Further, the average color values of the eight surrounding pixels that are adjacent to this particular pixel is represented by a "Average Color" label and has a red color value of 101, a green color value of 150, and a blue color value of 124. The difference in values from the particular pixel and the average color value is represented by a "Sum of Difference" label and has the overall value difference for the red, green, and blue color components at 32. In this example, the "Threshold Value" label has the threshold value set at 150.

In this example, the particular pixel as identified within the "Single Color" label would not be identified by the single point identification module 360 as an isolated color. This particular pixel would not be identified as an isolated color because the sum of the difference of the color between the particular pixel and the surrounding pixels is below the threshold value.

In another example, if the threshold value is lowered to a value of 30, then this particular pixel would be identified by the single point identification module 360 as an isolated color. In one embodiment, the threshold value is raised which makes it harder to include a pixel as an isolated color if the color variation within the frame is less uniform. Similarly, the threshold value is lowered which makes it easier to include a pixel as an isolated color if the color variation within the frame is more uniform.

In one embodiment, the pixel separation module 370 determines whether the pixel within the frame should be classified as either lossy data or lossless data. In one embodiment, the pixel separation module 370 places pixels that have a color that matches the color list (as identified by the color manager module 320) into a lossless data category.

Further, the pixel separation module 370 also moves a pixel that is identified by the single point identification module 360 from the lossless category into the lossy category in one embodiment.

In one embodiment, the compression module 380 is configured to compress data corresponding to pixels within the frame. In one embodiment, compression algorithms such as JPEG and JPEG2000 are utilized to compress pixels categorized as lossy data. Typically, lossy data includes rich continuous tone graphics, laden with significant RGB color pixels. In one embodiment, compression algorithms such as RLE, LZW or Arithmetic Coding are utilized to compress pixels categorized as lossless data. Typically, lossless data is mainly composed of text and substantial same color blocks.

The system 300 in FIG. 3A is shown for exemplary purposes and is merely one embodiment of the methods and apparatuses for generating compressed data representing a visual frame. Additional modules may be added to the system 300 without departing from the scope of the methods and apparatuses for generating compressed data representing a visual frame. Similarly, modules may be combined or deleted without departing from the scope of the methods and apparatuses for generating compressed data representing a visual frame.

Figure 4:
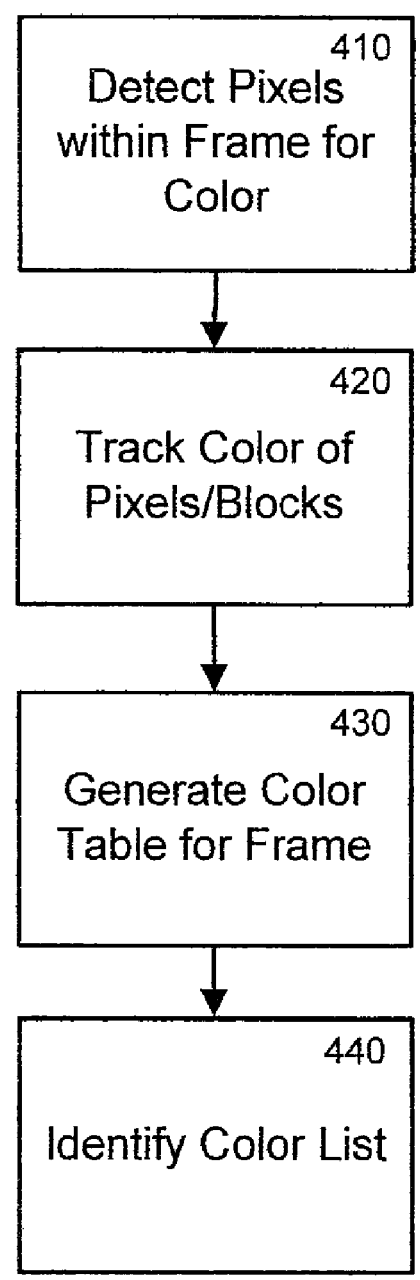
FIG. 4 is a flow diagram consistent with one embodiment of the methods and apparatuses for generating compressed data representing a visual frame.

The flow diagrams as depicted in FIGS. 4 and 5 are one embodiment of the methods and apparatuses for generating compressed data representing a visual frame. The blocks within the flow diagrams can be performed in a different sequence without departing from the spirit of the methods and apparatuses for generating compressed data representing a visual frame. Further, blocks can be deleted, added, or combined without departing from the spirit of the methods and apparatuses for generating compressed data representing a visual frame.

The flow diagram in FIG. 4 illustrates analyzing and tracking the color of each pixel within a frame according to one embodiment of the invention.

In Block 410, the pixels within a frame are detected. In one embodiment, the color of each pixel is detected. In one embodiment, the color of each pixel is comprised of three components such as a red component, a blue component, and a green component.

In Block 420, the location of each pixel with the associated color is tracked. In one embodiment, the location of each pixel with the associated color is tracked through the color manger module 320. Further, pixels having the same or similar color adjacent to each other are detected as a block of pixels in one embodiment. In another embodiment, pixels having the same or similar color that are within a general area of each other are detected as a block of pixels. In one embodiment, blocks of pixels are detected through the color manager module 320.

In Block 430, a color table is generated. In one embodiment the color table is generated through the color manager module 320.

In Block 440, a color list is identified. In one embodiment, the color list identifies at least one color that meets the criteria of having sufficient number of pixels and/or blocks of pixels having the same color. In one embodiment the color list is generated through the color manager module 320.

The flow diagram in FIG. 5 illustrates separating and compressing data according to one embodiment of the invention.

In Block 505, the pixels within a frame are detected. In one embodiment, the color of each pixel is detected. In one embodiment, the color of each pixel is comprised of three components such as a red component, a blue component, and a green component.

In Block 510, a color list is identified. In one embodiment, the color list identifies at least one color that meets the criteria of having sufficient number of pixels and/or blocks of pixels having the same color. In one embodiment the color list is generated through the color manager module 320.

In Block 515, the pixels within the frame are separated into different categories. In one embodiment, the pixels are separated into a lossy category and a lossless category. If a particular pixel has a color matching a color on the color list, then the particular pixel is separated into the lossless category. If the particular pixel has a color that does not match a color on the color list, then the particular pixel is separated into the lossy category. In one embodiment, the pixel separate module 370 identifies the place of pixels into the different categories.

In Block 520, the pixels within the lossless category are checked for single point identification. In one embodiment, the single point identification module 360 identifies particular pixels that qualify as a single point pixel.

In Block 525, if there is a single point pixel identified, then this particular pixel is moved from the lossless category and placed into the lossy category in Block 530.

If there are additional pixels to check within the lossy category to check for single point identification, then additional pixels are analyzed within the Block 520.

If there are no additional pixels to check within the loss category in Block 535, then the lossy data is compressed within the Block 540.

In Block 545, the lossless data is compressed.

The foregoing descriptions of specific embodiments of the invention have been presented for purposes of illustration and description. The invention may be applied to a variety of other applications. For example, the pixels within a frame are described throughout the invention for exemplary purposes. The pixels within multiple frames may be utilized such that each frame comprises one frame within a video stream.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
   detecting, by a device having a processor, a color of each of a plurality of pixels within a frame;
   grouping a portion of the plurality of pixels having a common color into a block; and
   generating a color list including the common color based on a threshold value corresponding to the block, wherein the threshold value is based on a number of blocks containing pixels with the common color.

2. The method according to claim 1 further comprising generating a color table, wherein the color table includes a number of pixels representing the portion of the plurality of pixels that comprise the block.

3. The method according to claim 1 further comprising generating a color table, wherein the color table includes a number of blocks having the common color.

4. The method according to claim 1 wherein the threshold value is based on a size of the block.

5. A method comprising:
   detecting, by a device having a processor, a color of each of a plurality of pixels within a frame;
   grouping a portion of the plurality of pixels having a common color into a block; and
   generating a color list including the common color based on a threshold value corresponding to the plurality of pixels, wherein the threshold value is a number of pixels within the frame having the common color.

6. The method according to claim 1 wherein the block includes adjacent pixels having the common color.

7. The method according to claim 1 wherein the block includes pixels having the common color within a predetermined area.

8. The method according to claim 1 further comprising forming a color variation value for the frame, wherein the common color includes variations of color within a range based on the color variation value.

9. The method according to claim 8 further comprising adjusting the range through the color variation value based on the color of each of the plurality of pixels within the frame.

10. The method according to claim 9 wherein the range is widened thus allowing a wider range of colors to be considered a same color when the color of each of the plurality of pixels within the frame is more varied.

11. The method according to claim 9 wherein the range is narrowed thus allowing a narrower range of colors to be considered a same color when the color of each of the plurality of pixels within the frame is more uniform.

12. A system comprising:
    a processor;
    means for detecting a color of each of a plurality of pixels within a frame;
    means for grouping a portion of the plurality of pixels having a common color into a block; and
    means for generating a color list including the common color based on a threshold value corresponding to the block, wherein the threshold value is a number of blocks containing pixels with the common color.

13. The system according to claim 12 where the means for generating the color list generate the color list based on a size of the block.

14. The system according to claim 12 where the means for generating the color list generate the color list based on a number of pixels within the block.

15. A system, comprising:
    a processor; and
    a memory configured to store a plurality of software modules executable by the processor, the software modules including
    a pixel color module configured to detect each color of a plurality of pixels within a frame, and
    a color manager module configured to track a number of the plurality of pixels having a common color and further configured to identify the common color within a color list, wherein the common color is included in the color list based on a threshold number of pixels within the frame having the common color.

16. The system according to claim 15 wherein the software modules further include a storage module configured to store the color list.

17. The system according to claim 15 wherein the software modules further include an interface module configured to receive the plurality of pixels.

18. The system according to claim 15 wherein the color manager module is further configured to determine a variation threshold to describe parameters of the common color.

19. The system according to claim 15 wherein the color manager module is further configured to track each color within the plurality of pixels within a color table.

20. The method according to claim 5 wherein the threshold value is based on a size of the block.

21. The method according to claim 5 wherein the block includes adjacent pixels having the common color.

22. The method according to claim 5 wherein the block includes pixels having the common color within a predetermined area.

23. The method according to claim 5 further comprising forming a color variation value for the frame wherein the common color includes variations of color within a range based on the color variation value.

24. The method according to claim 23 further comprising adjusting the range through the color variation value based on the color of each of the plurality of pixels within the frame.

25. A system, comprising:
    a processor; and
    a memory configured to store a plurality of software modules executable by the processor, the software modules including
    a pixel color module configured to detect each color of a plurality of pixels within a frame, and
    a color manager module configured to track a number of the plurality of pixels having a common color to group the plurality of pixels having the common color as a block, and further configured to identify the common color within a color list, wherein the common color is included in the color list based on a threshold number of the blocks, within the frame, having pixels with the common color.

26. The system according to claim 25 wherein the color manager module is further configured to determine a variation threshold to describe parameters of the common color.

27. The system according to claim 25 wherein the color manager module is further configured to track each color within the plurality of pixels within a color table.

* * * * *

UNITED STATES PATENT AND TRADEMARK OFFICE
CERTIFICATE OF CORRECTION

| | |
|---|---|
| PATENT NO. | : 7,801,356 B2 |
| APPLICATION NO. | : 11/458310 |
| DATED | : September 21, 2010 |
| INVENTOR(S) | : Xiang Li et al. |

It is certified that error appears in the above-identified patent and that said Letters Patent is hereby corrected as shown below:

Col. 7, Line 15, should read:

the threshold value is a number of blocks

Signed and Sealed this

Sixteenth Day of November, 2010

David J. Kappos
*Director of the United States Patent and Trademark Office*